US007820591B2

(12) United States Patent
Ryu et al.

(10) Patent No.: US 7,820,591 B2
(45) Date of Patent: Oct. 26, 2010

(54) HIGHLY ATTRITION RESISTANT AND DRY REGENERABLE SORBENTS FOR CARBON DIOXIDE CAPTURE

(75) Inventors: Chong-Kul Ryu, Daejeon Metropolitan (KR); Joong-Beom Lee, Daejeon Metropolitan (KR); Tae-Hyoung Eom, Daejeon Metropolitan (KR); Je-Myung Oh, Daejeon Metropolitan (KR)

(73) Assignees: Korea Electric Power Corporation, Seoul (KR); Korea South-East Power Co., Ltd., Seoul (KR); Korea South Power Co., Ltd., Seoul (KR); Korea Western Power Co., Ltd., Seoul (KR); Korea Midland Power Co., Ltd., Seoul (KR); Korea East-West Power Co., Ltd., Seoul (KR)

( * ) Notice: Subject to any disclaimer, the term of this patent is extended or adjusted under 35 U.S.C. 154(b) by 854 days.

(21) Appl. No.: 11/029,038

(22) Filed: Jan. 4, 2005

(65) Prior Publication Data
US 2006/0148642 A1 Jul. 6, 2006

(51) Int. Cl.
  *B01J 20/04* (2006.01)
  *B01D 53/62* (2006.01)
  *B01J 8/00* (2006.01)
(52) U.S. Cl. .............. 502/400; 423/212; 423/230; 423/215.5; 423/421; 423/427; 95/139
(58) Field of Classification Search ............ 502/84, 502/400; 423/212, 230, 215.5, 421, 427; 95/139
See application file for complete search history.

(56) References Cited

U.S. PATENT DOCUMENTS

| 4,515,900 | A | * | 5/1985 | Hettinger et al. | ............ 502/63 |
| 5,091,358 | A | * | 2/1992 | Birbara et al. | ............ 502/412 |
| 5,214,019 | A | * | 5/1993 | Nalette et al. | ............ 502/400 |
| 7,067,456 | B2 | * | 6/2006 | Fan et al. | ............ 502/400 |

FOREIGN PATENT DOCUMENTS

JP   2000-063574   2/2000

* cited by examiner

*Primary Examiner*—Timothy C Vanoy
*Assistant Examiner*—Diana J Liao
(74) *Attorney, Agent, or Firm*—Ladas & Parry LLP

(57) ABSTRACT

Disclosed herein is a dry regenerable sorbent for carbon dioxide capture from flue gas produced by fossil fuel-fired power plants including industrial boilers before being released to atmosphere or from fuel gas stream such as syngas produced by conversion of fossil fuel (e.g. gasification), by dry regenerable sorbent technology. The dry regenerable sorbent comprises: 70 wt % or less of an active component selected from solid compounds capable of being converted to metal carbonates; 70 wt % or less of a support selected from solid porous non-metallic materials capable of imparting a required specific surface area to the sorbent; and 70 wt % or less of an inorganic binder selected from cement-like, clay-like, and ceramic-like binders capable of imparting mechanical strength to the sorbent, the total weight of the solid raw materials being 100 wt %.

4 Claims, No Drawings

HIGHLY ATTRITION RESISTANT AND DRY REGENERABLE SORBENTS FOR CARBON DIOXIDE CAPTURE

The present invention relates to a dry regenerable sorbent (hereinafter, referred to simply as a "sorbent") for carbon dioxide ($CO_2$) capture necessary for the capture of carbon dioxide generated by the conversion of a fossil fuel in industrial plants, including thermal power generation plants, before being released to the air atmosphere, by a dry regenerable sorbent technology.

Carbon dioxide ($CO_2$) is one of the greenhouse gases. The increasing use of fossil fuels leads to an increase in the amount of $CO_2$ released to the atmosphere. It is known that carbon dioxide ($CO_2$) is the most serious greenhouse gas affecting global warming. Without control of such $CO_2$ discharge, global warming will cause a global environmental disaster. $CO_2$ can be removed from gas streams, i.e. flue gas streams produced by fossil fuel-fired power plants including industrial boilers and syngas streams produced by the gasification of coal and reforming of natural gases (commonly called "fuel gases". To put it briefly, carbon dioxide can be removed from flue gases and fuel gases. Processes for the removal of $CO_2$ from flue gases include wet chemical absorption, adsorption, membrane separation, low temperature distillation, and the like. However, since these processes require considerable removal costs of carbon dioxide, they are limited in $CO_2$ capture, particularly, from a large volume of flue gases.

An alternative removal of carbon dioxide from flue gases is a dry chemical scrubbing process, which is different from the wet chemical scrubbing process in that a solid sorbent is used instead of a liquid solvent. Dry regenerable sorbent technology refers to a technology wherein an active component present in a solid sorbent is chemically reacted with carbon dioxide in an absorber to form a carbonate or bicarbonate, enabling the removal of the carbon dioxide from gas streams, and the carbon dioxide-sorbed sorbent is regenerated by heating in a regenerator (or calcinator), making it possible to reuse the sorbent.

Dry regenerable sorbent technology has advantages in terms of low-price raw materials, reusability by regeneration, design flexibility, environmental friendliness, applicability of low-energy absorption processes, high carbon dioxide sorption capacity with high reaction rate, and the like, over other technologies. Accordingly, dry regenerable sorbent technology is recognized as a promising technology capable of continuously growing and developing in the future.

U.S. Pat. No. 6,387,337 B1 (May 14, 2002) issued to Pennline Henry W from the United States Department of Energy suggests a process for removing carbon dioxide from a gas stream through continuous sorption of carbon dioxide and regeneration using an alkali metal or alkaline earth metal compound in a moving-bed reactor at a temperature range of 93° C. to 1,093° C. (i.e. 200° F. to 2,000° F.). A sorbent used herein is limited to the alkali metal or the alkaline earth metal compound deposited on a support.

The present invention is directed to a solid sorbent required for the capture of carbon dioxide in a fluidized-bed or transport absorber and a fluidized-bed or transport regenerator. The reactivity (sorption capacity and reaction rate), shape and mechanical strength of the sorbent are critical in order to repeatedly use the sorbent in the fluidized-bed or transport reactors. The solid sorbent particles undergo collision, abrasion, fracture and cracking during the fast circulation through the two reactors, to form a fine powder. The attrition of the sorbent involves physical attrition due to the movement of the sorbent, and chemical attrition due to expansion/shrinkage resulting form chemical reaction.

To minimize the attrition, there have been trials to improve the mechanical strength of a sorbent by forming in various ways. The morphology, such as porosity (i.e. pore properties and specific surface area), of the composite sorbent is closely related with the overall reaction rate. Thus, it is important to maximize the sorbent utilization of an active component substantially reacting with $CO_2$ and at the same time, to minimize the loss due to the attrition. Because of the fact that the mechanical strength of a sorbent is inversely proportional to the reactivity of the sorbent, it is difficult to develop a sorbent simultaneously satisfying the mechanical strength and reactivity requirements.

Requirements for an ideal solid sorbent are as follows: 1) high sorption capacity and high sorption rate, 2) suitability for conditions of flue gases or gas streams, 3) removal of $CO_2$ to a low concentration, 4) high purity of the captured $CO_2$, etc. In addition, a solid sorbent must have sufficient physical and chemical strength (durability) for use in an appropriate process, be regenerable, and have suitable flow characteristics for an appropriate process.

High reactivity, particularly, high sorption capacity enables reduction in the amount of sorbent being required, and handling and regeneration costs, leading to low capital and operating costs. Since conventional methods for $CO_2$ capture involve troublesome steps of compressing and cooling a flue gas stream, a process for $CO_2$ capture from flue gases under ambient conditions is preferred. Further, a method for removing $CO_2$ from a flue gas stream to a low concentration at a high removal percentage is desirable. Moreover, if a gas obtained from a sorbent during regeneration is only $CO_2$, it is most desirable.

Since the solid dry regenerable sorbent technology proposed in the present invention advantageously meets the above-mentioned requirements, the sorbent of the present invention can be applied to not only flue gases released from industrial boilers, such as thermal power generation plants, but also fuel gases discharged from advanced power plants, such as Integrated gasification combined cycles.

As solid active components, there can be mentioned alkali metal compounds (usable only at 200° C. or below) for flue gases or fuel gases, alkaline earth metal compounds (usable at high temperatures), and various mixed oxides (usable at 200~900° C.).

U.S. Pat. No. 6,280,503 B1 (Aug. 28, 2001) discloses the adsorption of carbon dioxide from gas streams at 300~500° C. by using a solid adsorbent containing magnesium oxide (MgO) and an alkali metal carbonate promoter, which is produced by a precipitation method.

U.S. Pat. No. 6,387,845 B1 (May 14, 2002) issued to Toshiba, Japan, discloses a fixed-bed procedure for removing carbon dioxide under a temperature region of about 500° C. by using a lithium silicate sorbent as a mixed oxide, or a mixed powder sorbent of lithium silicate and potassium carbonate.

U.S. Pat. No. 5,079,209 (Jan. 7, 1992), U.S. Pat. No. 5,091,358 (Feb. 25, 1992) and U.S. Pat. No. 5,480,625 (Jan. 2, 1996), issued to United Technologies Corporation, describe sorbents impregnated with silver oxide (AgO), and suggest that the sorbents are comprised of an active component, a support, an inorganic salt binder, and a promoter and can capture carbon oxide at ambient temperature and regenerate the captured carbon dioxide at about 160~250° C. However, none of these patent publications teach the $CO_2$ sorption capacity of the sorbents.

It is also known that an amine deposited on a support, which is different from the sorbent of the present invention, can be used as an adsorbent at ambient temperature range.

U.S. Pat. No. 5,492,683 (Feb. 20, 1996) and U.S. Pat. No. 5,876,488 (Mar. 2, 1999) issued to United Technologies Corporation describe the removal of carbon dioxide at room temperature by using a liquid amine-deposited solid adsorbent.

U.S. Pat. No. 4,810,266 (Mar. 7, 1989) issued to Allied Signal Inc. discloses the removal of carbon dioxide at room temperature by using a solid adsorbent in which an amine is deposited on a carbon molecular sieve.

The above-mentioned patents are directed to sorbents impregnated or deposited with active components, or the active components per se. These sorbents are unsuitable for use in a fluidized-bed or transport process for capture and separation of carbon dioxide, in which process solid sorbent particles continuously circulate between the absorber and regenerator at a high speed. They do not have suitable shape and performance for capture and separation of $CO_2$ in a cost-effective and energy-efficient manner.

The present invention provides a method for preparing a dry regenerable sorbent, comprising the steps of: mixing and dispersing a composition consisting essentially of active component(s), support(s) and inorganic binder(s) in water to obtain a slurry; forming the slurry in a spray dryer to produce sorbent particles; and calcining the sorbent particles. A dry regenerable sorbent prepared by the method of the present invention can perform $CO_2$ absorption (carbonation) at 40~110° C. and can be subjected to regeneration (or calcination) at 80~200° C. to repeat $CO_2$ removal in fluidized-bed and transport reactors. The method of the present invention can be directly applied to prepare a sorbent which can be used under operational conditions of 200° C. or more.

Formulation of the sorbent is accomplished in accordance with the following procedure. First, a dispersant is added to water in a given amount, and an alkali metal carbonate or an alkali metal bicarbonate as an active component is added thereto so that the active component can be dissolved as much as possible. Thereafter, a high specific surface area (BET) support, such as ceramic, zeolite, a carbon molecular sieve or a composite support thereof, is added to the aqueous solution, and mixed. A cement-like, clay-like or ceramic-like inorganic binder, or a combination of the inorganic binders is added to the mixture to prepare a mixed slurry at a high concentration. The raw material particles are subjected to comminution in a high-energy bead mill, and dispersed to obtain stable and uniform slurry. After other materials (including dusts, a lump of dried slurry, and impurities) are removed from the slurry, the obtained slurry is formed using a spray drier to prepare the final sorbent.

Therefore, it is a first object of the present invention to provide a dry regenerable sorbent for carbon dioxide capture necessary for the capture of carbon dioxide generated by the conversion of fossil fuels in fossil fuel-fired power plants including industrial plants, before being released to the atmosphere, by a dry regenerable sorbent technology, wherein the sorbent has suitable shape, particle size, particle size distribution, mechanical strength or attrition resistance and reactivity for a fluidized-bed or transport process for $CO_2$ capture.

It is a second object of the present invention to provide a free-flow, semispherical solid sorbent having an average particle size of 40~180 μm, preferably 60~160 μm, and having a particle size distribution of 30~500 μm, preferably 40~300 μm, by a spray drying technique wherein the shape, particle size and particle size distribution of the solid sorbent are suitable for a fluidized-bed or transport process.

It is a third object of the present invention to provide a sorbent comprising 5~70 wt % of an active component, wherein the active component selectively reacts with carbon dioxide present in a gas stream to efficiently capture the carbon dioxide, and is selected from alkali metal carbonates and bicarbonates, alkaline earth metal carbonates, and metal oxides capable of being converted to the carbonates and bicarbonates.

It is a fourth object of the present invention to provide a sorbent comprising 5~70 wt % of a support selected from ceramics, including alumina and silica, natural and synthesized zeolites, and carbon molecular sieves (carbon nanotubes) wherein the support has a high specific surface area, increases the reactivity by uniformly distributing the active component in the sorbent particles, adsorbs or absorbs moisture required for the reaction, and is hydrophilic or imparts sufficient hydrophilicity to the sorbent.

It is a fifth object of the present invention to provide a sorbent comprising 5~70 wt % of an inorganic binder capable of imparting sufficient mechanical strength for a fluidized-bed or transport-bed carbon dioxide capture process to the sorbent wherein the inorganic binder is selected from cement-like inorganic binders, such as calcium silicate and calcium aluminate, clay-like inorganic binders, such as bentonite and kaolin, and ceramic-like inorganic binders, such as alumina sol, silica sol and pseudo-boehmite.

It is a sixth object for accomplishing the first object of the present invention to provide a method for obtaining a slurry by homogenizing the sorbent raw materials described in the third to fifth objects with water as a solvent and organic additives, e.g., a dispersant, a flow control agent, a defoamer and an organic binder, prior to spray drying, such that sorbent particles are formed by a spray drier.

It is a seventh object of the present invention to provide a method for comminuting the raw material particles in a high concentration of an alkaline electrolyte aqueous solution to form nanoparticles, and a method for using the organic additives to disperse and stabilize the nanoparticles.

It is an eighth object of the present invention to provide a method for obtaining a well-dispersed, stable and free-flowing slurry of which concentration is 15 wt %~50 wt %. In slurry preparation, this invention also use 0.01~10 wt % of a dispersant and a flow control agent, 0.001~1 wt % of a defoamer, and 0.5~5 wt % of an organic binder, based on the total weight of the solid raw materials in order to impart sufficient strength to a green body formed by spray drying.

It is a ninth object of the present invention to provide a method for pre-drying the formed green body using a spray drier and calcining the dried green body.

Therefore, it is an object of the present invention to provide a dry regenerable sorbent suitable to efficiently capture $CO_2$ from flue gas released from large-scale combustion equipment, such as thermal power generation plants, iron and steel industry, petrochemical plants and cement plants. This invention will eventually be suitable for a $CO_2$ capture technique on a large scale for solving environmental problems, such as global warming, incorporating with cost-effective and energy-efficient process like fluidized/transport-bed process.

It is another object of the present invention to provide a method for preparing the dry regenerable sorbent.

Raw materials of the dry regenerable sorbent according to the present invention are low-cost alkali metal compounds and alkaline earth metal compounds. In addition, since the dry regenerable sorbent can be used at an operating temperature of 200° C. or less, which corresponds to a temperature range of flue gases discharged from a power plant, an additional heat supply is unnecessary. Accordingly, the use of the dry regenerable sorbent in a $CO_2$ capture technique is advantageous in both cost reduction and energy reduction.

The method of the present invention is characterized by the use of a spray drying technique for the purpose of preparing free-flowing solid sorbent particles having suitable shape, particle size and particle size distribution for a fluidized-bed or transport process, and of preparing a solid sorbent efficiently reacting with carbon dioxide. More specifically, the method of the present invention comprises: adding the solid raw materials and organic additives selected from dispersants, defoamers, organic binders, etc., required for dispersion of the particles to water to obtain a uniform slurry; spray-drying the slurry to form sorbent particles (i.e. green body); and pre-drying and calcining green body. At this time, the solid raw materials have an optimum composition in a given formulation ratio, and are homogenized before spray drying.

The raw materials of the solid sorbent consist of an active component, a support, and an inorganic binder.

The active component is a material capable of selectively reacting with carbon dioxide to efficiently capture and separate the carbon dioxide present in a gas stream, and is selected from carbonates and bicarbonates of alkali metals and alkaline earth metals of the Group I and II series of the periodic table of elements, and metal oxides capable of being converted to the carbonates.

The sorbent of the present invention comprises 5~70 wt %, and preferably 10~50 wt % of the active component, based on the total weight of the solid raw materials. The active component may be a metal carbonate, a metal bicarbonate, or a metal oxide, all of which can react with carbon dioxide and water in a gas stream to form a metal bicarbonate ($MHCO_3$) or react with carbon dioxide to form a metal carbonate. There is no particular restriction on the kind of active components. The active component may be synthetic or natural. The purity of active components usable in the present invention is preferably 98% or higher.

The support used in the present invention has a high specific surface area, increases the reactivity by uniformly distributing the active component in the sorbent particles, adsorbs or absorbs moisture required for the reaction, and is hydrophilic or imparts sufficient hydrophilicity to the sorbent. The support is selected from ceramics, including alumina and silica, natural and synthesized zeolites, celite (diatomaceous earth), and carbon molecular sieves (carbon nanotubes). The sorbent of the present invention comprises 5~70 wt %, and preferably 15~40 wt % of the support, based on the total weight of the solid raw materials. Specific examples of supports used in the present invention include Celite, Molecular sieve 13X (Tricat Zeolites GmbH Zeosorb 13X powder), and alumina (Versal G Alumina powder). The Zeosorb 13X contains 45.4 wt % of $SiO_2$, and has a specific surface area of 733 $m^2/g$. The molar ratio of $SiO_2$ to $Al_2O_3$ in the Zeosorb 13X is 100:2.5. The alumina contains 99.8% of $Al_2O_3$, and has a specific surface area of 150 $m^2/g$ (VGL-15) or 250 $m^2/g$ (VGL-25).

The inorganic binder is a material used to impart sufficient strength to the sorbent, and is selected from cement-like inorganic binders, e.g., calcium silicate and calcium aluminate, clay-like inorganic binders, e.g., bentonite and kaolin, and ceramic-like inorganic binders, e.g., alumina sol, silica sol and boehmite, etc. The sorbent of the present invention comprises 5~70 wt %, and preferably 10~50 wt % of the inorganic binder, based on the total weight of the solid raw materials.

The kind of cement inorganic binders usable in the present invention is not particularly limited, but hydraulic cements, such as Portland cement (or anhydrous calcium silicate), are preferred.

Examples of the clay-like binders used in the present invention include, but are not specially limited to, natural, modified and synthetic clay-like binders. Preferred clay-like binders include materials belonging to smectites and kandites, and are sodium bentonite and kaolin which show plasticity in an aqueous solution.

The ceramic-like binders are nano-sized materials, or materials at the nanometer-scale level dispersed in water, and their examples include ceramic powders, such as alumina, silica, zirconia, titania and magnesia, ceramic sols, and pseudo-boehmite.

The organic additives used to disperse and homogenize the solid raw materials into water solution in the present invention, consist of a dispersant, a slurry flow control agent as a kind of dispersant, a defoamer, and an organic binder. Since an aqueous mixture of the solid raw materials shows poor plasticity and is difficult to disperse, it is difficult to obtain a well-dispersed and uniform colloidal slurry. Further, when the solid raw materials are comminuted into a fine powder, agglomeration of fine particles tends to occur and thus the comminution efficiency is lowered. When the particle size distribution of the solid particles is at the nanometer-scale level (about 10 nm~5,000 nm), the use of a dispersant is indispensable. Examples of dispersants usable in the present invention include anionic, nonionic, cationic and amphoteric (zwitterion) dispersants, and combinations thereof. These dispersants are suitable to prepare a high concentration of slurry (15~60 wt %). Specifically, highly compatible nonionic and anionic dispersants are preferably used in the present invention. There is no particular restriction on the kind of nonionic dispersants, but suitable nonionic dispersants are fluorosurfactants manufactured by DuPont or 3M. The amount of nonionic dispersants used in the present invention is limited to 0.01~0.3 wt %, based on the total weight of the solid raw materials. The kind of anionic dispersants usable in the present invention is not particularly limited, but preferred anionic dispersants include polycarboxylic acids, polycarboxylic acid amines, polycarboxylic acid amine salts, and polycarboxylic soda salts. The sorbent of the present invention comprises 0.1~10 wt % of the anionic dispersant, based on the total weight of the solid raw materials.

The defoamer used in the present invention is a material capable of removing bubbles formed in the slurry during mixing the nonionic and anionic dispersants with the organic binder, and is selected from metal soap-based and polyester-based nonionic surfactants. The sorbent of the present invention comprises 0.001~1 wt % of the defoamer, based on the total weight of the solid raw materials.

The organic binder added in the course of preparation of the slurry imparts sufficient plasticity and flowability to the slurry, and imparts sufficient strength to a sorbent green body to be produced by the subsequent spray drying, thereby facilitating the handling of the green body prior to pre-drying and calcining. Examples of preferred organic binders that can be used in the present invention include polyvinylalcohols (PVAs), polyethylene glycols (PEGs), methyl celluloses, and mixtures thereof. The sorbent of the present invention comprises 0.5~5 wt % of the organic binder, based on the total weight of the solid raw materials.

The method of the present invention comprises the steps of: adding the solid raw materials, and if necessary organic additives, to water, and mixing to obtain a slurry; wet-comminuting the slurry particles to disperse and homogenize the raw solid materials. When the size of the raw material particles is a few micrometers or smaller, the comminution step may be omitted. The method of the present invention may further comprise the step of removing other materials (including dusts, a lump of dried slurry, large-sized raw materials and other impurities) contained in the well-dispersed, stable and free-flowing slurry by sieving.

More detailed explanation will be described below. The preparation of the sorbent for carbon dioxide capture from the composition is performed by the following procedure. First, each of raw materials is precisely weighed. Considering the concentration of a slurry, i.e., solid-liquid ratio (w/w), distilled water is placed into a container so as to correspond to the liquid proportion. Thereafter, a dispersant and a defoamer are added to the aqueous mixture. After an active component, such as, soda ash, is completely dissolved in the mixture, Molecular sieve 13X as a support, and calcium silicate, pseudo-boehmite or bentonite as an inorganic binder are added to the solution. If the active component is baking soda having a low solubility, it is firstly added the support and the inorganic binder to an aqueous solution and followed by baking soda. At this time, a dispersant or a flow control agent required to impart sufficient flowability to the slurry and smoothly mix the constituent materials of the slurry, together with a defoamer, are added to the aqueous solution. To prevent the use of an excessive amount of the dispersant, the concentration of the slurry can be adjusted by the addition of water. At this time, the concentration of the slurry is between 15 wt % and 60 wt %. When the raw materials are mixed with the water to obtain the slurry, a mixer can be used. Examples of mixers used herein include, but are not particularly limited to, mechanical stirrers, homogenizers, ultrasonic homogenizers, high-shear blenders, and double-helix mixers. The mixers can be appropriately selected depending on the amount of the raw materials.

The solid raw materials present in the slurry are comminuted to 1 µm or less, i.e. nanometer-scale level, and homogeneously dispersed. Since the surfactant, i.e. the dispersant or the flow control agent, can prevent the agglomeration of the slurry particles, the slurry is stably obtained.

The mechanical comminution of the solid raw materials is performed by wet comminution techniques using various mills, such as an air-jet mill, a roller mill, a ball mill, an attrition mill, a vibratory mill, a planetary mill, and a bead mill. A high-energy bead mill is preferably used in the present invention. The high-energy bead mill includes a rotor and a stator. Milling media are filled into gap formed between the rotor and the stator so as to occupy 60~80% of the chamber volume. In this manner, milling of the particles and homogenization of the slurry can be achieved. Yttrium stabilized zirconia beads are used as the milling media in order to prevent the contamination of the raw materials due to attrition. The balls have the same size distribution within 0.3 mm to 1.25 mm. To obtain particle having a size of 1 µm or less in the present invention, the slurry is subjected to milling or wet comminution at least twice or more. For the subsequent second milling it may be necessary to control the flow character of the first milled slurry by adjusting concentration of slurry with water, or adding a flow control agent(s) (or dispersants) and a defoamer. Thereafter, the slurry mixture is pumpable to mill to proceed the subsequent milling smoothly.

An organic binder is added to well-dispersed and uniform slurry from mill. Dispersant and defoamer or water is, if necessary, added to well-dispersed and uniform slurry in order to control the slurry characteristics. Then the slurry is aged and sieved to remove other materials from the slurry, and transferred to a spray drier via a pump. A variety of organic binders can be used in the present invention, but a modified polyethylene glycol (PEG) is mainly used in an amount of 0.5~5%. The viscosity of the final slurry is not specifically restricted so long as the final slurry is pumpable to a nozzle or an atomizer in a spray-dryer to form sorbent particles. The slurry in this invention prefers to have a viscosity of not lower than 300 cP, and is transferred to a spray drier via the pump.

The well-dispersed, stable and free-flowing slurry is spray-dried to produce a spherical sorbent particles (called green body). The operational conditions of the spray drier are selected so that the particle size distribution is between 30 µm and 500 µm. There are several factors affecting the shape, particle size and particle size distribution of the sorbent particles, and the morphology or texture of the sorbent. For example, the concentration, viscosity and dispersion of the slurry, feed pressure and feeding amount of the slurry in to nozzle in a spray dryer, and the drying capacity and temperature of the spray drier, etc. These factors vary depending on the structure of the spray drier and the type of atomizer used.

There is no particular restriction on the type of the spray drier. The present inventors designed and manufactured an electric heater type spray drier wherein the dimension of a drying chamber is 2 m×1 m (height×diameter) and tall height including collecting chamber of product is ×2.94 m. By adapting ether a rotary wheel atomizer or a centrifugal pressure nozzle at an upper portion of the spray drier, co-current spray drying can be performed. In addition, a pressure nozzle arranged at a bottom side of the spray drier was designed for spray drying in a counter-current fountain configuration to increase the trajectory of slurry droplet from a pressure nozzle. In this configuration, sorbent particles having an average particle size of about 40 µm to 180 µm are routinely obtain due to the increase of retention time of slurry droplet in a drying chamber. Representative operational conditions for the spray drier are as follows. Feed pressure range: 6~30 kg/cm$^2$ (typically 10 kg/cm$^2$), inner diameter of a pressure nozzle: 0.51 mm, inlet temperature range of the spray drier: 260~300° C., and outlet range temperature of the spray drier: 90~150° C.

The sorbent green body produced by spray drying is dried for at least 2 hours in a convection oven under an air temperature of 100~150° C. The dried green body is calcined for 2 hours or more under air atmosphere in a furnace to prepare the final sorbent. The calcination temperature is between 350° C. and 1,000° C., and preferably between 350° C. and 850° C. with ramping rate of greater than 2° C./min. To efficiently remove the solvents and organic additives during calcination step, the green body is allowed to stand at a few hundred interval each for 1~2 hours (e. g. 200° C. and 500° C. for 600° C. calcination), and is then heated to the final calcination temperature of 350~850° C.

The present invention will now be described in more detail with reference to the following examples. However, these examples are given for the purpose of illustration and are not to be construed as limiting the scope of the invention.

EXAMPLE 1

In this example, sorbents consisting of 20-50% of soda ash ($Na_2CO_3$) as an active component, 0-20% of celite (diatomaceous earth) as a support, and 50-60% of an inorganic binder, based on the total weight (2 kg) of the solid raw materials, were prepared in accordance with the respective compositions indicated in Table 1.

Each of the sorbents was prepared by the following procedure. The raw materials were added sequentially or simultaneously to water until the slurry concentration reached about 35%, followed by the addition of a dispersant and a defoamer. The slurry was stirred using a homogenizer capable of stirring at a variable speed within 10,000~25,000 rpm. The mixed slurry was milled twice using a high-energy bead mill to obtain colloidal slurry. To the colloidal slurry was added about 1.25 wt % of polyethylene glycol (PEG, HS-BD-20A, Sannopco Korea) as an organic binder. The resulting slurry was stirred, aged for 2 hours or more, and sieved to remove other materials. After the final concentration of the slurry was adjusted within the range of about 28 wt % to about 32 wt %, the slurry was spray-dried to form a sorbent green body. The green body was pre-dried in a dryer at 120° C. for 2 hours or more, and was then calcined in a furnace at 650° C. for 2 hours or more to prepare a sorbent. The green body was stayed at 200° C., 400° C. and 500° C. each for one hour before reaching the calcining temperature. At this time, the temperature was elevated at a rate of about 5° C./min. The sorbents thus prepared were designated as "A", "B" and "C" by the content of the active component in the sorbents.

Table 1 summarizes the composition of the sorbents containing celite as a support and the characteristics of the slurries.

TABLE 1

Composition of sorbents and characteristics of slurries containing celite as support

| | Sorbents | | |
|---|---|---|---|
| | A | B | C |
| $Na_2CO_3$, wt % | 50 | 30 | 20 |
| Celite, wt % | | 20 | 20 |
| calcium silicate, wt % | 35 | 35 | 45 |
| Na bentonite, wt % | 5 | 5 | 5 |
| P-boehmite, wt % | 10 | 10 | 10 |
| Total solid, wt % | 100 | 100 | 100 |
| Dispersant, wt % | 2.3 | 1.6 | 1.9 |
| Defoamer, wt % | 0.1 | 0.05 | 0.05 |
| Organic binder, wt % | 1.25 | 1.25 | 1.25 |
| Slurry concentration, wt % | 32 | 32 | 28 |
| Slurry pH | 10.7 | 10.6 | 10.7 |
| Slurry viscosity, cP | 380 | 700 | 1180 |

EXAMPLE 2

A dry regenerable, high specific surface area sorbent was prepared in the same manner as in Example 1, except that Molecular sieve 13X (733 m$^2$/g) was used as a support and the total weight of the solid raw materials scale-upped to 15 kg.

5 g of a nonionic dispersant (Florad Fluorosurfactant FC 4430, 3M) and 2 ml of a defoamer (NOPCO NXZ, Sannopco Korea) were added to 24.5 liters of distilled water, and then the mixture was stirred mixer for 2 minutes using a double helix. 4.5 kg of soda ash ($Na_2CO_3$) was added to the aqueous solution (pH 11.04 at 27° C.) with stirring. To the mixture were sequentially and slowly added 3 kg of Molecular sieve 13X, 1.5 kg of p-boehmite, 1.5 kg of sodium bentonite, and 5.25 kg of calcium silicate (Microcel C, Celite Korea). All solid raw materials were added to water, and then the mixture was stirred for about one hour (pH 10.8 at 24° C.). The resulting mixed slurry was transferred to a high-energy bead mill using a peristaltic pump, where the solid raw materials were comminuted and dispersed. 7.5 liters of water was added to the first milled slurry, and stirred using a double-helix mixer. Thereafter, the first milled slurry was further milled. 420 g of PEG, 6 liters of water and 1 ml of a defoamer were added to the second milled slurry, stirred using a double helix mixer, and sieved to remove other materials from the second milled slurry. The slurry was subjected to aging for 24 hours or more. The concentration and the viscosity of the final slurry were adjusted to about 26% and 1,100 cP, respectively. The slurry was transferred and pressurized to a nozzle using a Moyno cavity pump, and thus spray-dried to produce a sorbent green body. The green body was pre-dried and calcined in a similar manner to that in Example 1 to prepare sorbent "D". At this time, the calcination was conducted at 500° C.

EXAMPLE 3

A dry regenerable, high specific surface area sorbent was prepared in the same manner as in Example 2, except that sodium bicarbonate ($NaHCO_3$) or baking soda was used as the active component.

4 g of a nonionic dispersant (FC 4430, 3M) and 2 ml of a defoamer (NOPCO NXZ, Sannopco Korea) were added to 29 liters of distilled water, and then the mixture was stirred for 2 minutes using a double helix mixer. To the mixture were sequentially and slowly added 5.25 kg of calcium silicate (Microcel C, Celite Korea), 1.5 kg of sodium bentonite, 1.5 kg of p-boehmite, and 3 kg of Molecular sieve 13X. 4.5 kg of sodium bicarbonate ($NaHCO_3$) was slowly added to the mixture with stirring. After adding all solid raw materials to water, and then the mixture was stirred for about 10 minutes (pH 8.2 at 17° C.).

The resulting mixed slurry was passed through a high-energy bead mill using a peristaltic pump to obtain slurry. The first milled slurry was aged for 15 hours, and was further milled. 7.5 liters of water was added during the first and second milling. 420 g of PEG as an organic binder (HS-BD-20A, Sannopco Korea), 3 liters of water and 1 ml of a defoamer were added to the second milled slurry, stirred using a double helix mixer, and sieved to remove other materials from the second milled slurry. The slurry was subjected to aging for 24 hours or more. 2 ml of an anionic dispersant (Sannopco Dispersant SN-5468) and a defoamer (HS-Defoamer 551, Sannopco Korea) were added to the aged slurry to control the viscosity of the slurry to about 1,200 cP. Further aging was conducted for 15 hours or more. The slurry was transferred and pressurized to a nozzle using a Moyno cavity pump (or eccentrical pump), and thus spray-dried to produce a sorbent green body. The green body was pre-dried and calcined in a similar manner to that in Example 1 to prepare sorbent "E". At this time, the calcination was conducted at 500° C.

Table 2 summarizes the composition of the sorbent containing Molecular sieve 13X as a support and the characteristics of the slurry.

TABLE 2

Composition of sorbent containing Molecular sieve 13X as support and characteristics of slurry

| | Sorbents | |
|---|---|---|
| | D | E |
| $Na_2CO_3$, wt % | 30 | |
| $NaHCO_3$, wt % | | 30 |
| Molecular sieve 13X, wt % | 20 | 20 |
| Calcium silicate, wt % | 35 | 35 |
| Na bentonite, wt % | 5 | 5 |
| P-boehmite, wt % | 10 | 10 |
| Total solid, wt % | 100 | 100 |
| Nonionic dispersant, wt % | 0.033 | 0.027 |
| Anionic dispersant, wt % | | 0.7 |
| Defoamer, wt % | 0.02 | 0.04 |

TABLE 2-continued

Composition of sorbent containing Molecular sieve
13X as support and characteristics of slurry

|  | Sorbents | |
|---|---|---|
|  | D | E |
| Organic binder, wt % | 1.26 | 1.26 |
| Slurry concentration, wt % | 26.3 | 25.7 |
| Slurry pH | 10.9 | 8.9 |
| Slurry viscosity, cP | 1120-1400 | 1100 |

EXAMPLE 4

A sorbent was prepared in the same manner as in Example 3, except that high surface area alumina was used instead of Molecular sieve 13X as a support, soda ash (sodium carbonate) was used as an active component. The total weight of the solid raw materials was scale-upped to 20 kg.

4 g of a nonionic dispersant (FC 4430, 3M), 750 ml of an anionic dispersant (HS-DISPERSANT 6067M, Sannopco Korea), 10 ml of a first defoamer (NOPCO NXZ, Sannopco Korea), 20 ml of a second defoamer (HS-Defoamer 551, Sannopco Korea), and 10 ml of a defoamer (SN-Defoamer 485, Sannopco Korea) were added to 40 liters of distilled water, and then the mixture was stirred using a double-helix mixer for about 5 minutes. 6 kg of sodium carbonate ($Na_2CO_3$) was added to the aqueous solution, and stirred using a double-helix mixer until complete dissolution. To the solution were slowly and sequentially added 9.6 kg of alumina powder, 1 kg of sodium bentonite, 2 kg of pseudo-boehmite, and 1.4 kg of calcium silicate (Microcel C, Celite Korea) with stirring using a double-helix mixer. All solid raw materials were added to water, and stirred for about 10 minutes (pH 10.74 at 23.5° C.).

The mixed slurry was transferred to a high-energy bead mill via a peristaltic pump, where the solid raw materials were subjected to milling. 5 liters of water and 400 ml of a dispersant (6067M) were added to the first milled slurry to increase the flowability of the slurry, and then the resulting mixture was subjected to second milling. To the second milled slurry were added 560 g of PEG (HS-BD-20A, Sannopco Korea) as an organic binder, 1 liter of distilled water, and 100 ml of a dispersant (6067M). The resulting slurry was mixed using a double helix mixer, and was then subjected to third milling. The third milled slurry was sieved using 45 μm sieves under vacuum to remove other materials from the slurry. The resulting slurry was aged for about 10 hours. The concentration, pH, and viscosity of the slurry were about 29 wt %, 10.56 (26.5° C.), and 230,000 cP (spindle #4, 0.6 rpm), respectively. The slurry was transferred to a spray drier using a Moyno cavity pump (or eccentrical pump), and spray-dried through a nozzle to produce a sorbent green body. At this time, the feed pressure of the slurry was 18~21 kg/cm². The green body was pre-dried and calcined in a similar manner to that in Example 1 to prepare sorbent "F". The calcination was conducted at 500~650° C.

Table 3 summarizes the composition of the sorbent containing alumina as a support and the characteristics of the slurry.

TABLE 3

Composition of sorbent containing alumina
as support and characteristics of slurry

|  | Sorbents | |
|---|---|---|
|  | F | G |
| $Na_2CO_3$, wt % | 30 |  |
| $K_2CO_3$, wt % |  | 35 |
| Alumina, wt % | 48 | 43 |
| Calcium silicate, wt % | 7 | 7 |
| Na bentonite, wt % | 5 | 5 |
| P-boehmite, wt % | 10 | 10 |
| Total solid, wt % | 100 | 100 |
| Nonionic dispersant, wt % | 0.02 | 0.02 |
| Anionic dispersant, wt % | 4.14 | 4.31 |
| Defoamer, wt % | 0.19 | 0.25 |
| Organic binder, wt % | 1.26 | 1.26 |
| Slurry concentration, wt % | 29 | 30 |
| Slurry pH | 10.9 | 11.3 |
| Slurry viscosity, cP | 260,000 | 63,000 |

EXAMPLE 5

A sorbent was prepared in the same manner as in Example 4, except that potassium carbonate was used as an active component.

4 g of a nonionic dispersant (FC 4430, 3M), 1,100 ml of an anionic dispersant (HS-DISPERSANT 6067M, Sannopco Korea), 10 ml of a first defoamer (NOPCO NXZ, Sannopco Korea), 21 ml of a second defoamer (HS-Defoamer 551, Sannopco Korea), and 10 ml of a third defoamer (SN-Defoamer 485, Sannopco Korea) were added to 42 liters of distilled water, and then the mixture was stirred for about 5 minutes using a double-helix mixer. 7 kg of potassium carbonate ($K_2CO_3$) was added to the aqueous solution, and stirred using a double-helix mixer until complete dissolution. To the solution were slowly and sequentially added 8.6 kg of alumina powder, 1 kg of sodium bentonite, 2 kg of pseudo-boehmite, and 1.4 kg of calcium silicate (Microcel C, Celite Korea) with stirring using a double-helix mixer. After adding all solid raw to water, and slurry was further stirred for about 10 minutes.

The mixed slurry was transferred to a high-energy bead mill via a peristaltic pump, where the solid raw materials were subjected to milling. 200 ml of a dispersant (6067M) was added to the first milled slurry to increase the flowability of the slurry, and then the resulting mixture was subjected to second milling in a high-energy bead mill. To the second milled slurry were added 560 g of PEG (HS-BD-20A, Sannopco Korea) as an organic binder, 2 liters of distilled water, 20 ml of a dispersant (6067M), and 10 ml of a defoamer (HS-Defoamer 551). The resulting slurry was mixed using a double helix mixer, and was then subjected to third milling. The third milled slurry was sieved using 45 μm sieves under vacuum to remove other materials from the slurry. The resulting slurry was aged for about 10 hours. The concentration, pH, and viscosity of the slurry were about 29.64 wt %, 11.31 (21.2° C.), and 44,000~82,000 cP (spindle #4, 1.5 rpm), respectively. The slurry was transferred to a spray drier using a Moyno cavity pump (or eccentrical pump), and spray-dried through a nozzle to produce a sorbent green body. At this time, the feed pressure of the slurry was 12~15 kg/cm². The green body was pre-dried and calcined in a similar manner to that in Example 1 to prepare sorbent "G". The calcination was conducted at 500~650° C. Table 3 summarizes the composition of the sorbent containing alumina as a support and the characteristics of the slurry.

EXAMPLE 6

Physical properties of fresh sorbents A~G prepared in Examples 1 to 5 by a spray-drying technique were evaluated by the following analytical methods: SEM for shape, the tap density meter (ASTM D 4164-88) for bulk density, size analyzer (or sieve) for size and size distribution, the standard BET for specific surface area and pore volume, Hg porosimetry for pore volume and porosity.

The attrition resistance of the sorbents for fluidized-bed application was measured with a modified three-hole air-jet attrition tester based on the ASTM D 5757-95. The attrition index (AI) was determined at 10 slpm (standard liter per minute) flowrate over 5 h as described in the ASTM method. The attrition index is the percent fines generated over 5 h.

The AI's of the fresh Akzo and Davison FCC (fluidized catalytic cracking) catalysts as references are 22.5 and 18.4% at the same conditions, respectively. It would be acceptable in a fluidized-bed $CO_2$ capture process that materials with an AI of below 30% for transport reactor or even below 60% for bubbling fluidized-bed reactor are adequate to use under atmospheric pressure of flue gas. A lower value of attrition index (AI) indicates better attrition resistance of bulk particles.

Chemical reactivities of sorbents A~G were assessed using a simultaneous thermal analyzer (Rheometric Scientific STA 1500) that has dual functions of thermogravimetric analysis (TGA) and differential scanning calorimetry (DSC).

Carbonation were done at 50~70° C. for sorbents A~F and 70~100° C. for sorbent G. The regeneration was also done at below 120° C. for sorbents A~F and 100~160° C. for sorbent G. The simulated flue gas compositions for sorbents A~F were 14.4 vol % $CO_2$, 5.4 vol % $O_2$, 10 vol % $H_2O$ (unless specified), and $N_2$ balance. Sorbent G was also tested under the same simulated flue gas as sorbents A~F except 5~7 vol % $H_2O$. The amount of the samples used for the tests was 10 mg scale. A total flow rate was 60 ml/min (standard). Regeneration gas was a pure $N_2$ gas with a flow rate of 60 std ml/min.

Physical properties and $CO_2$ reaction characteristics of sorbents A~G are summarized in Table 4. The attrition resistance used herein refers to attrition index (AI). The lower the attrition index, the better the attrition resistance. The utilization (%) shows the percentage of a measured $CO_2$ sorption capacity with respect to the theoretical $CO_2$ sorption capacity of each sorbent, and is an index for the utilization efficiency of the active components contained in each sorbent.

As apparent from the above description, the present invention provides a method for preparing a dry regenerable sorbent which can be directly applied to a fluidized-bed $CO_2$ capture process. In particular, the method of the present invention comprises the steps of mixing an active material, a support, an inorganic binder and organic additives to obtain a colloidal aqueous slurry, and forming the slurry into a green body by spray drying. Since the method of the present invention is advantageous in the preparation of a sorbent on a commercial scale at relatively low costs, it is considered to be competitive. In particular, monoethanolamine (MEA) currently used as an active component in a wet scrubbing employed in industries rapidly reacts with $CO_2$, but is poor in $CO_2$ sorption capacity. For example, the $CO_2$ sorption capacity of a 15.3 wt % aqueous MEA solution is about 3 wt %, and the utilization efficiency of the solution is on the order of about 30%. Although trials have been conducted to increase the $CO_2$ sorption capacity up to 6 wt % by increasing the MEA concentration to 30.3 wt %, it is known that the concentration of the MEA is limited to 20 wt % or lower due to strong causticity of the MEA. Sorbents D and E containing 20~30 wt % of the respective active components show comparable or superior $CO_2$ sorption capacity to pure soda ash ($Na_2CO_3$) and baking soda ($NaHCO_3$), and show a larger $CO_2$ sorption capacity than that (6 wt %) expected in the wet amine process.

As can be seen from the data in Table 4, sorbents A~C have small surface area. As the specific surface area is smaller, adsorption capacity of water and opportunities to contact with carbon dioxide in a sorbent become less. For these reasons, it is important to ensure a high specific surface area and a high porosity in the preparation of a sorbent.

TABLE 4

Physical properties and $CO_2$ reaction characteristics of each sorbent

| | Sorbents | | | | | | | | |
| --- | --- | --- | --- | --- | --- | --- | --- | --- | --- |
| | A | B | C | D | E | F | G | $Na_2CO_3$ | $NaHCO_3$ |
| Shape[a] | ss | ss | ss | ss | ss | Ss | ss | | |
| APS[b], μm | 125 | 121 | 100 | 128 | 122 | 102 | 98 | | |
| SD[c], μm | 42-303 | 42-303 | 38-196 | 38-355 | 53-303 | 42-231 | 42-231 | | |
| Bulk density, g/ml | 0.46 | 0.56 | 1.0 | 0.57 | 0.5 | 0.9 | 1.1 | | |
| BET[d], m²/g | 5.4 | 3.8 | 6.8 | 36.6 | 39.7 | 76 | 51 | | |
| Hg porosity, %, | 78 | 76 | 63 | 81 | 83 | 69 | 63 | | |
| AI[e], % | 80 | 66 | 14 | 85 | 62 | 4.8 | 0.08 | | |
| TGA $CO_2$ sorption capacity[f], wt % | 5.8 | 4 | 0.4 | 8.8 | 9.8 | 9.3 | 8.73 | 3.2 | 15.9 |
| Sorbent utilization, % | 28 | 32.4 | 5.2 | 71 | 89 | 74 | 78 | 7.8 | 61 |
| Regenerability[g], % | NC | NC | NC | NC | NC | NC | NC | NC | NC |

[a]ss: semisphere,
[b]APS: average particle size,
[c]SD: size distribution,
[d]BET: specific surface area,
[e]AI: attrition index, the net $CO_2$ sorption capacity was measured by TGA.
[g]Regenerability for sorbents A~F measured at 120° C. and one for sorbent G at 120~150° C. with $N_2$ gas,
NC: near completion.

Table 4 clearly shows that sorbents F and G show suitable physical and chemical properties for use in a commercial fluidized-bed or transport $CO_2$ capture process.

Therefore, according to the dry regenerable $CO_2$ sorbent of the present invention, one of unique features of sorbents is capable of imparting sufficient hydrophilicity and a large specific surface area such that the sorbent is easily brought into contact with carbon dioxide and water required for the reaction. Still one of unique features is all solid components being uniformly distributed inside solid particles as one integral body.

In the case of fluidized/transport-bed $CO_2$ capture process application, there are several advantages by the sorbent of the present invention. For example, high sorption capacity provides high $CO_2$ removal efficiency from flue gas with repeated cyclic use or continuous use. High attrition resistance of sorbent, which is even superior to commercial fluidized catalytic cracking catalysts, provides less amount of refill of additional sorbent since that little fine powder occurs by attrition due to rapid circulation of the solid sorbent particles in the course of a fluidized-bed process. In addition to those mention above, high reactivity (high sorption capacity and high sorption rate) and high utilization efficiency of the sorbent can also reduce the amount of the sorbent used. Such innovation of sorbent in this invention provides an opportunity to design the compact process and thus economically competitive with the existing technologies.

Particularly, the fluidized-bed or transport reactor is designed based on the volume of sorbent it holds not the weight of the sorbent. Thus the higher the bulk density of the sorbent, the faster and easier the sorbent circulation can be achieved between the two reactors. For the same $CO_2$ removal duty, temperature increase in the absorber due to the exothermic reaction in nature can be easily controlled due to the increase in sorbent mass flowrate. In addition, the active component used in the present invention has a high $CO_2$ sorption capacity even with less amount of active component, it can inhibit a temperature rise in the solid sorbent due to the action of support and inorganic binder as a diluent. Therefore the process become compact to reduce the capital cost for a process design.

Direct application of natural or synthetic alkali metal carbonates ($M_2CO_3$, M=Na or K) to the process has many problems (e.g., causticity and deposition in a downstream process). However, since the sorbent of the present invention is a composite porous sorbent in which the less amount of active component is uniformly distributed in sorbent particle as an integral body. Thus it is less caustic when compared to pure active components and is less eluted by water present in a flue gas and deposited in the down process, thereby preventing the process from being interrupted.

Since the raw materials of the sorbent according to the present invention are relatively cheap and costs involved in the preparation of the sorbent can also be greatly reduced since a spray-drying process is extensively employed in the production of catalysts.

Soda ash sorbents (i.e. sodium-based sorbents) and potassium ash sorbents (potassium-based sorbents), which are suggested in the present invention, are almost completely regenerated at 120° C. or less and 160° C. or less, respectively. Therefore, since a $CO_2$ capture process using the sorbent of the present invention can be performed at 200° C. or less, which corresponds to a temperature range of a flue gas, additional heat supply is not required.

Therefore, the use of the dry regenerable $CO_2$ sorbent according to the present invention is advantageous in both cost-effective and energy-efficient manner. The $CO_2$ capture process can be applied to the capture of carbon dioxide even under high temperature gas streams at 200° C. or more.

What is claimed is:

1. A dry regenerable sorbent for carbon dioxide capture from flue gas produced by fossil fuel-fired power plants including industrial boilers before being released to atmosphere or from fuel gas stream such as syngas produced by conversion of fossil fuel (e.g. gasification), by dry regenerable sorbent technology,
   wherein the sorbent comprises:
   solid raw materials comprising:
   10~60 wt % of an active component selected from carbonates or bicarbonates of sodium or potassium;
   15~40 wt % of a support selected from solid porous non-metallic materials hydrophilic and capable of imparting a required specific surface area to the sorbent; and
   10~60 wt % of an inorganic binder selected from cement-like, clay-like, and ceramic-like binders capable imparting mechanical strength to the sorbent,
   wherein the total weight of the solid raw materials being 100 wt %, and
   wherein the purity of active component is 98% or higher, and
   wherein the sorbent has a spherical shape, a specific surface area of 50 $m^2$/g or more, and a porosity of 30% or more, bulk density of 0.4 g/ml or more, a carbon dioxide sorption capacity of 3% or more, a utilization efficiency of 7% or more, an attrition index (AI) of 90% or less, an average particle size of 60~160 μm, and a particle size distribution of 40~300 μm, and
   wherein the sorbent is used to capture and separate carbon dioxide in a fluidized-bed or transport absorber and a fluidized-bed or transport regenerator at a temperature range of 40~200° C.

2. The dry regenerable sorbent according to claim 1, wherein the support is at least one material selected from ceramic-like supports, including alumina, silica, magnesia, zirconia and titania, natural and synthesized zeolites, diatomaceous earth, and carbon molecular sieves (carbon nanotubes).

3. The dry regenerable sorbent according to claim 1, wherein the inorganic binder is a cement-like, a clay-like or a ceramic-like binder, and is at least one binder selected from these binders.

4. The dry regenerable sorbent according to claim 3, wherein the cement binder is hydraulic cement, and is at least one material selected from calcium silicate (Portland cement), calcium aluminate cements, and gypsum ($CaSO_4.2H_2O$);
   the clay-like binder is at least one material selected from bentonite, attapulgite (palygorskite) and sepiolite belonging to smectites, and kaolin belonging to kandites; and
   the ceramic-like binder is at least one material selected from ceramics, such as alumina, silica, zirconia, titania and magnesia, ceramic sols, and pseudo-boehmite.

* * * * *